(12) United States Patent
Domenicali

(10) Patent No.: US 8,330,087 B2
(45) Date of Patent: Dec. 11, 2012

(54) SPECTRAL IMAGING SYSTEM WITH DYNAMIC OPTICAL CORRECTION

(75) Inventor: Peter L. Domenicali, Lynnfield, MA (US)

(73) Assignee: Cambridge Research & Instrumentation, Inc., Woburn, MA (US)

( * ) Notice: Subject to any disclaimer, the term of this patent is extended or adjusted under 35 U.S.C. 154(b) by 495 days.

(21) Appl. No.: 12/251,632

(22) Filed: Oct. 15, 2008

(65) Prior Publication Data

US 2009/0096914 A1   Apr. 16, 2009

Related U.S. Application Data

(60) Provisional application No. 60/980,310, filed on Oct. 16, 2007.

(51) Int. Cl.
*G01J 1/20* (2006.01)

(52) U.S. Cl. ............ 250/201.1; 250/206; 250/216; 348/345; 359/362

(58) Field of Classification Search .......... 250/201.1, 250/206, 216, 214.1, 214 R; 359/362, 368; 348/345, 360
See application file for complete search history.

(56) References Cited

U.S. PATENT DOCUMENTS

| | | |
|---|---|---|
| 5,521,705 A | 5/1996 | Oldenbourg et al. |
| 5,539,517 A | 7/1996 | Cabib et al. |
| 5,784,162 A | 7/1998 | Cabib et al. |
| 5,834,203 A * | 11/1998 | Katzir et al. ............ 435/6 |
| 5,991,028 A | 11/1999 | Cabib et al. |
| 5,995,645 A | 11/1999 | Soenksen et al. |
| 6,007,996 A | 12/1999 | McNamara et al. |
| 6,142,629 A | 11/2000 | Adel et al. |
| 6,373,568 B1 | 4/2002 | Miller et al. |
| 6,421,131 B1 | 7/2002 | Miller |
| 6,690,466 B2 | 2/2004 | Miller et al. |
| 6,825,930 B2 | 11/2004 | Cronin et al. |
| 6,920,239 B2 | 7/2005 | Douglass et al. |
| 6,924,893 B2 | 8/2005 | Oldenbourg et al. |

(Continued)

FOREIGN PATENT DOCUMENTS

WO     WO 98/43042     10/1998

(Continued)

OTHER PUBLICATIONS

Andrew Rabinovich et al., "Quantitative Spectral Decomposition for Stained Tissue Analysis," UCSD Jacobs School of Engineering 24$^{th}$ Annual Research Expo, Feb. 25, 2005.

*Primary Examiner* — Francis M Legasse, Jr.
(74) *Attorney, Agent, or Firm* — Fish & Richardson P.C.

(57) ABSTRACT

Disclosed herein are multispectral detection methods and systems that can be used with image-forming optics configured to form an image of a sample. The systems include: (a) an imaging detector; (b) relay optics that include multiple optical elements, the relay optics positioned to relay the image formed by the image-forming optics to the imaging detector; (c) an actuator coupled to one of the optical elements in the relay optics and configured to adjust a position of the coupled optical element; and (d) control electronics configured to cause the actuator to adjust the position of the coupled optical element in the relay optics in response to a wavelength band selection by a wavelength selection element positioned to select one wavelength band for the image from among two or more wavelength bands within an overall wavelength range.

52 Claims, 8 Drawing Sheets

U.S. PATENT DOCUMENTS

| | | |
|---|---|---|
| 7,321,791 B2 | 1/2008 | Levenson et al. |
| 2002/0030755 A1* | 3/2002 | Uchino ........................ 348/342 |
| 2003/0081204 A1 | 5/2003 | Cronin et al. |
| 2003/0138140 A1 | 7/2003 | Marcelpoil et al. |
| 2003/0153825 A1* | 8/2003 | Mooradian et al. ........... 600/407 |
| 2003/0223248 A1 | 12/2003 | Cronin et al. |
| 2004/0245430 A1* | 12/2004 | Konishi ..................... 250/201.2 |
| 2005/0065440 A1 | 3/2005 | Levenson |
| 2006/0082762 A1 | 4/2006 | Leverette et al. |
| 2006/0119865 A1 | 6/2006 | Hoyt et al. |
| 2006/0245631 A1 | 11/2006 | Levenson et al. |
| 2007/0016082 A1 | 1/2007 | Levenson et al. |
| 2007/0159541 A1* | 7/2007 | Sparks et al. ................. 348/272 |
| 2007/0231784 A1 | 10/2007 | Hoyt et al. |
| 2008/0074644 A1 | 3/2008 | Levenson et al. |
| 2008/0074649 A1 | 3/2008 | Levenson et al. |
| 2009/0226059 A1 | 9/2009 | Levenson et al. |
| 2009/0257640 A1 | 10/2009 | Gossage et al. |
| 2010/0075373 A1 | 3/2010 | Hoyt |
| 2011/0182490 A1 | 7/2011 | Hoyt et al. |

FOREIGN PATENT DOCUMENTS

| | | |
|---|---|---|
| WO | WO 2005/040769 | 5/2005 |
| WO | WO 2006/081547 | 8/2006 |
| WO | WO 2008/039758 | 4/2008 |

* cited by examiner

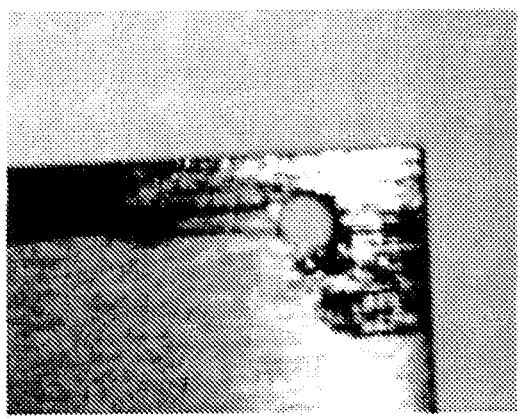
6a. 700 nm, no dynamic compensation
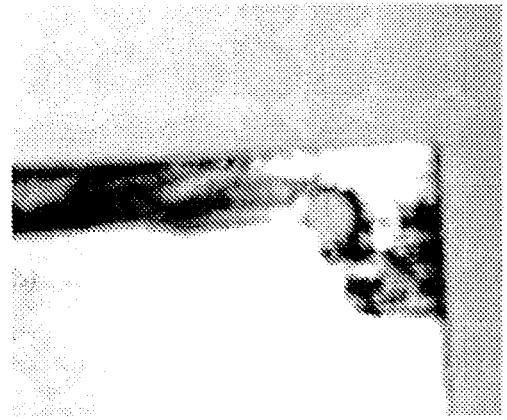
6b. 800 nm, no dynamic compensation
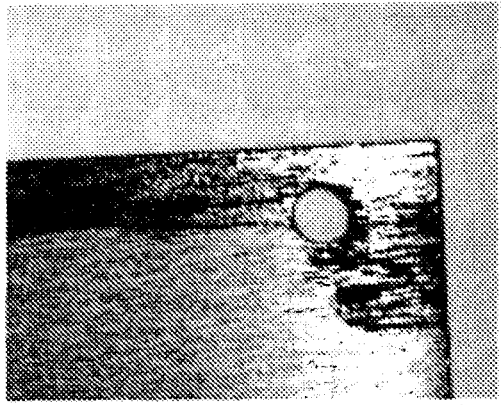
7a. 700 nm with dynamic compensation
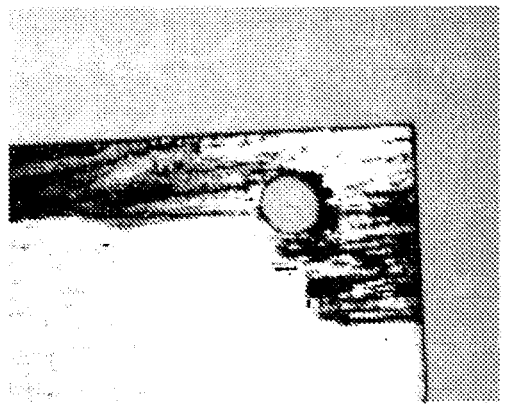
7b. 800 nm with dynamic compensation

SPECTRAL IMAGING SYSTEM WITH DYNAMIC OPTICAL CORRECTION

CROSS-REFERENCE TO RELATED APPLICATIONS

This application claims priority under U.S.C. §119(e) to U.S. Patent Application Ser. No. 60/980,310 entitled "SPECTRAL IMAGING SYSTEM WITH DYNAMIC OPTICAL CORRECTION" and filed Oct. 16, 2007, the contents of which are incorporated herein by reference.

TECHNICAL FIELD

This disclosure relates to imaging systems and methods, and in particular, to systems and methods for measuring image data at multiple wavelengths.

BACKGROUND

Multispectral imaging can provide spatial and spectral information about samples and scenes, so that each pixel in an image can be described in terms of its optical spectrum. As a result, spectral analysis of such images can yield valuable information about the composition, appearance, and other aspects of a sample.

A multispectral dataset can be considered to have the form of an image cube, with two spatial dimensions and one spectral dimension. Various instruments have been devised to acquire spectral image cubes, and these can be grouped according to how they acquire data: point-sequential spectral (PSS) systems; line-sequential spectral (LSS) systems; imaging interferogram (IIF) systems; and band-sequential image (BSI) systems. The latter systems incorporate a wavelength-selection element such as a tunable filter or filter wheel, along with an imaging detector.

SUMMARY

It can be beneficial to obtain a high quality spectral image cube which is substantially free from instrumental artifacts. Particularly, it can be desirable that the measured spectrum at each point be truly representative of the sample or scene at the corresponding location, and that signals from adjacent pixels not be blurred or mixed together. This means that optical systems used in multispectral imaging are sufficiently free from aberrations such as coma, blur, field curvature, and so on, that they do not degrade the image objectionably. Ideally, such optical systems have a point-spread function (PSF) that delivers most or all of the energy from a monochromatic point source into a single spatial pixel, and into a spectral band having a width that corresponds to the spectral resolution of the instrument.

Achieving this level of performance can be made difficult by the operation of multispectral imaging systems over a range of wavelengths. Multispectral systems whose operating range spans an appreciable spectral breadth may use reflective optics, or apochromatic lenses, or other optical elements which exhibit relatively small amounts of chromatic defects such as, for example, axial chromatic aberration (also termed focus shift), and chromatic variation in magnification (also termed lateral color). The use of such optical designs and components results in high complexity and cost.

Multispectral imaging designs can make use of a relay lens to relay an image from one location in the system to another position. This is done in some cases to provide access to the optical beam for placement of components such as filters or stops. Relay lenses can also provide for magnification or demagnification, to match the original image to a sensor used to detect the image. In some systems, a first lens is used to develop a collimated beam from a first image, from which the second image is developed by re-imaging with a second lens; this pair of lenses may be viewed as forming a relay lens. Often, one or more components essential to the multispectral functionality are placed in the collimated portion of the beam.

It can be desirable to construct a general-purpose multispectral camera which does not include an integral objective, but instead can be used with a variety of objectives or imaging-forming systems, such as microscopes, telescopes, and camera lenses. In this case, the need for high optical quality applies not only to the multispectral camera, but also to the other components such as the objective or image-forming system that is attached to it, and to any intervening optics used to couple the two. In some instances, these additional elements are not suitable for high-performance multispectral imaging. For example, the optical elements may have been made for other less-demanding applications, such as for photographic or visual imaging purposes, or with other constraints in mind, such as fluorescence microscopy, where epi-illumination is supported by the imaging system.

It can be desirable to obtain multispectral datasets that are not limited to one spectral range, such as the visible, but which can span a larger range, such as a spectral range from 500-950 nm, which includes the visible and near-infrared ranges. Similarly, systems that extend down toward 400 nm or less, or which extend upward to 1100 nm or more, would be valuable.

Disclosed herein is a multispectral imaging system ("MSIS") that does not rely upon extreme performance from the optical imaging components employed, but obtains high performance nonetheless. This is accomplished generally without compromising the image quality. For example, nearly-complete elimination of chromatic aberrations such as lateral color and/or focus shift can be achieved, so that accurate focusing and magnification can be provided and/or maintained at all wavelengths, even as the wavelength of the light is changed.

In certain embodiments, operation at a wide range of wavelengths can be achieved, such as a range spanning the visible and near-infrared range, or a range which spans a wider range of the infrared region than has heretofore been possible without degradation in imaging performance.

In some embodiments, the imaging system includes a general-purpose multispectral camera ("MSC") which does not include an integral objective, which can operate with a variety of objectives, and which corrects for deficiencies in these elements. In other words, the MSC is a modular system that can be interchangeably coupled to conventional image-forming systems. For example, the MSC can be operated with a lens, microscope, telescopes, or objective that has deficiencies such as lateral color or focus shift, and can compensate for these deficiencies so that an image cube is obtained exhibits a lower or even negligible degree of these kinds of deficiency. The multispectral camera need not perform modifications or adjustments of the objective or imaging system to achieve this performance.

In certain embodiments, improvements to imaging systems can be achieved without incurring a significant increase in cost or complexity, so the resulting system is more economical and robust than existing imaging systems.

During acquisition of each band in a band-sequential image (BSI) system, only a narrow range of wavelengths are presented to the detector and contribute to the image. Thus, while over the course of a measurement cycle a BSI system typically operates at a wide range of wavelengths, at any given instant, it operates using relatively monochromatic light. Accordingly, it is possible to compensate for chromatic defects to a very high degree if dynamic adjustment is provided to correct focus and magnification errors at each wavelength. Rather than designing an optical system which seeks to statically correct for all optical defects across the full spectral range at which images will be taken, the systems and methods disclosed herein provide for adjustment of one or more lens components whose position is changed to dynamically correct for optical deficiencies in the wavelength band being measured at that instant in time.

This less demanding optical task can be accomplished by employing a less complex optical system, obtaining as a result higher quality imagery and/or correcting for deficiencies in other elements of the overall system (such as in an objective or image-forming system). Further, all of these benefits can be achieved in varying degree according to the requirements at hand.

Dynamically correcting for chromatic errors does not free the optical designer from the need to correct for image curvature, or other types of image defect, such as the so-called Seidel aberrations (astigmatism, coma, and so on). However, since there is essentially very little or no chromatic error in the resulting system once dynamic correction is applied, the optical design can be developed under different, more relaxed constraints, and optimized for defects such as the Seidel terms with reduced regard for whether in such a design the magnification or focus may have a greater degree of chromatic variation.

In some embodiments, the systems and methods disclosed herein provide for control and correction of two parameters, such as focus and magnification. This enables compensation for chromatic focus shift and for lateral color.

In certain embodiments, the systems and methods disclosed herein include a BSI multispectral imaging system incorporating a relay lens with two lenses, or two groups of lenses, that are held on flexural mounts and are moved by mechanical actuators such as voice coils, under electronic control of a computer program which coordinates the wavelength selection, image acquisition, and lens adjustment.

In some embodiments, attributes of optical components are determined based on the known optical properties of the relay lens and other components of the multispectral imaging system using a ray tracing program to choose suitable settings of the dynamic correction elements $X_i(\lambda)$ according to a merit function.

In certain embodiments, the suitable settings are determined by imaging a known sample such as a grid test target, and adjusting the position of the dynamic correction elements $X_i(\lambda)$ at various wavelengths under computer control, while monitoring the resulting image that is obtained, to achieve a merit score that can include contributions for criteria such as sharpest focus, constancy of magnification, and other properties. Some embodiments include a multispectral camera which compensates for optical characteristics of not just the camera components, but of an objective or image-forming system to which the camera is connected.

In some embodiments, a multispectral camera is connected to a microscope that exhibits chromatic errors such as focus shift or lateral color, and the multispectral camera compensates for these errors. The errors can arise from the objectives, the tube lens, or other components, but regardless of origin, they can be compensated by the multispectral camera so that the image cube has superior characteristics. Typically, the multispectral camera is operated to obtain the result that the image cube is significantly freer of focus shift and/or magnification variation over the wavelength range of the measurement than would have otherwise been possible. If the microscope has several objectives with differing characteristics, the set of positions $X_i(\lambda)$ for the correction elements can be chosen to match the objective in use.

We now more generally summarize different aspects and features of the systems, apparatus, and methods disclosed herein.

In general, in a first aspect, the disclosure features a multispectral detection system for use with image-forming optics configured to form an image of a sample. The detection system includes: (a) an imaging detector; (b) relay optics that include multiple optical elements, the relay optics positioned to relay the image formed by the image-forming optics to the imaging detector; (c) an actuator coupled to one of the optical elements in the relay optics and configured to adjust a position of the coupled optical element; and (d) control electronics configured to cause the actuator to adjust the position of the coupled optical element in the relay optics in response to a wavelength band selection by a wavelength selection element positioned to select one wavelength band for the image from among two or more wavelength bands within an overall wavelength range.

Embodiments of the system can include one or more of the following features.

The system can include the image-forming optics.
The system can include the wavelength selection element.
The wavelength selection element can be positioned adjacent the imaging detector. The wavelength selection element can be positioned adjacent the aperture plate. The wavelength selection element can be positioned within the relay optics. The wavelength selection element can be positioned within the image-forming optics.

The imaging detector, relay optics, actuator, and control optics can all be part of a multispectral camera, and the multispectral camera can further include a modular housing that can be releasably coupled to a housing for the image-forming optics. In such cases, the multispectral camera can further include the wavelength selection element.

The control electronics can be configured to control the selection of the wavelength band by the wavelength selection element in response to a user input or preprogrammed protocol.

The system can include an aperture plate having an aperture positioned to receive the image from the image-forming optics, where the relay optics are configured to relay the image from the aperture to the imaging detector.

The coupled optical element can be a lens.
The control electronics can be configured to adjust the position of the coupled optical element to maintain a focus of the image in response to the wavelength band selection. The control electronics can be configured to adjust the position of the coupled optical element to maintain a magnification of the image in response to the wavelength band selection.

The system can include a second actuator coupled to a second one of the optical elements in the relay optics and configured to adjust a position of the coupled second one of the optical elements.

The control electronics can be configured to adjust the positions of each of the coupled optical elements to maintain a focus of the image, a magnification of the image, or both, in response to the wavelength band selection.

A magnification of the image formed by the image-forming optics can change in response to the wavelength band selection. The control electronics can be configured to adjust the position of the coupled optical element so that a magnification of the image on the imaging detector does not change in response to the wavelength band selection.

The wavelength selection element can include a rotatable filter wheel comprising optical filters, a tunable liquid crystal filter, a tunable acousto-optic filter, and/or one or more of these devices in combination.

The overall wavelength range can include a spectral range of 100 nm or more (e.g., 200 nm or more, 300 nm or more).

The selected wavelength band can include a distribution of wavelengths having a full-width at half-maximum (FWHM) width of 100 nm or less (e.g., 50 nm or less, 30 nm or less, 5 nm or less).

The wavelength selection element can be configured to select the one wavelength band from among 3 or more wavelength bands (e.g., from among 4 or more wavelength bands, from among 8 or more wavelength bands).

The image can include information measured at red, green, and blue wavelengths in the visible region of the electromagnetic spectrum. The image can be a false color image that includes information measured at one or more near-infrared wavelengths.

The relay optics can include one or more optical elements having a fixed position. The one or more optical elements can include at least one lens.

The image-forming optics can include a camera lens. The camera lens can be designed for operation in a visible region of the electromagnetic spectrum. The camera lens can be configured to form images at wavelengths in the visible region of the electromagnetic spectrum and at wavelengths of 700 nm or more.

The image-forming optics can include a microscope system. The microscope system can include an objective formed by an apochromat lens. The microscope system can include an objective formed by an achromat lens.

Images formed by the microscope system can be fluorescence images. For example, the microscope system can be a fluorescence microscope configured to transmit excitation light to a sample, and receive fluorescence from the sample in response to the excitation light (i.e., it can be configured for epi-illumination). Alternatively, or in addition, images formed by the microscope system can include optical radiation having wavelengths of 700 nm or more.

Embodiments of the system can include any other features disclosed herein, as appropriate.

In another aspect, the disclosure features a method that includes selecting a wavelength band for an image from among two or more wavelength bands within an overall wavelength range, adjusting a position of an optical element in a system of relay optics in response to the selection of the wavelength band, and receiving an image from image-forming optics, and relaying the image to an imaging detector using the relay optics.

Embodiments of the method can include one or more of the following features.

The method can include receiving the image in an aperture of an aperture plate, and relaying the image from the aperture to the imaging detecting using the relay optics.

The method can include selecting a wavelength band using a wavelength selection element. The wavelength selection element can be positioned adjacent the imaging detector. The wavelength selection element can be positioned adjacent the aperture plate. The wavelength selection element can be positioned within the relay optics. The wavelength selection element can be positioned within the image-forming optics.

Selecting the wavelength band for the image can be performed in response to a user input or preprogrammed protocol.

Adjusting the position of an optical element can include adjusting a position of a lens. The position of the optical element can be adjusted to maintain a focus of the image in response to the wavelength band selection. The position of the optical element can be adjusted to maintain a magnification of the image in response to the wavelength band selection.

The method can include adjusting a position of a second optical element in the system of relay optics in response to the selection of the wavelength band. The method can include adjusting the positions of each of the adjustable optical elements to maintain a focus of the image, a magnification of the image, or both, in response to the wavelength band selection.

Selecting the wavelength band can change a magnification of the image formed by the image-forming optics. The position of the optical element can be adjusted so that a magnification of the image on the imaging detector does not change in response to the wavelength band selection.

The wavelength band can be selected using a rotatable filter wheel comprising optical filters. The wavelength band can be selected using a tunable liquid crystal filter. The wavelength band can be selected using a tunable acousto-optic filter.

The overall wavelength range can include a spectral range of 100 nm or more (e.g., 200 nm or more, 300 nm or more).

The selected wavelength band can include a distribution of wavelengths having a full-width at half-maximum (FWHM) width of 100 nm or less (e.g., 50 nm or less, 30 nm or less, 5 nm or less).

The wavelength band can be selected from among 3 or more wavelength bands (e.g., from among 4 or more wavelength bands, from among 8 or more wavelength bands). In some embodiments, however, the dynamic correction can be for fewer than all of the wavelength bands.

The image can include information measured at red, green, and blue wavelengths in the visible region of the electromagnetic spectrum. The image can be a false color image that includes information measured at one or more near-infrared wavelengths.

The method can include maintaining one or more other optical elements of the relay optics in a fixed position when the position of the optical element is adjusted. The one or more optical elements can include at least one lens.

The image can be received from image-forming optics that include a camera lens. The camera lens can be designed for operation in a visible region of the electromagnetic spectrum. The image received from the camera lens can include optical radiation at wavelengths in the visible region of the electromagnetic spectrum and at wavelengths of 700 nm or more.

The image can be received from image-forming optics that include a microscope system. The image can be received from an objective of the microscope system that includes an apochromat lens. The image can be received from an objective of the microscope system that includes an achromat lens.

The image can include fluorescence radiation emitted by a sample. Alternatively, or in addition, the image can include optical radiation having wavelengths of 700 nm or more.

Embodiments of the method can also include any other method features disclosed herein, as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control.

In addition, the materials, methods, and examples are illustrative only and not intended to be limiting.

The details of one or more embodiments are set forth in the accompanying drawings and the description below. Other features and advantages will be apparent from the description, drawings, and claims.

BRIEF DESCRIPTION OF DRAWINGS

FIG. 6a shows an image of a sheet-metal metal part obtained at a wavelength of 700 nm using a Canon 70-200 mm F/4 mm zoom lens as the image-forming system in the system of FIGS. 1 and 2 illustrating a chromatic defect in the absence of dynamic correction, namely the image is out of focus.

FIG. 6b shows an image of the same sample under identical conditions as in FIG. 6a, except that filter 12 was tuned to a wavelength of 800 nm.

FIG. 7a shows an image obtained under the same conditions as FIG. 6a, except the positions $X_i(\lambda)$ of lenses 13 and 14 were set to their near-optimum positions for 700 nm.

FIG. 7b shows the corresponding image when filter 12 is tuned to 800 nm and the positions $X_i(\lambda)$ are set to their near-optimum positions for 800 m.

Like reference symbols in the various drawings indicate like elements.

DETAILED DESCRIPTION

Figure 1:
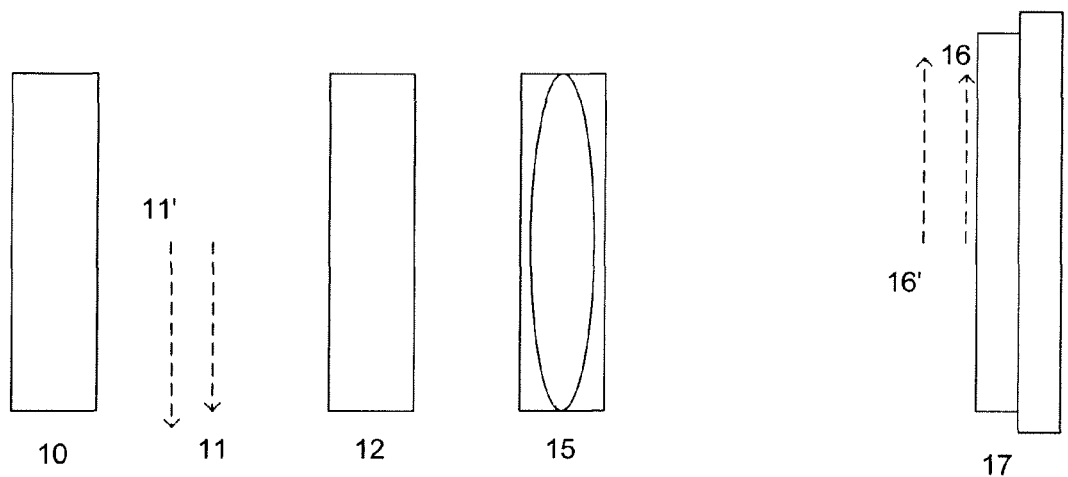
FIG. 1 shows a schematic representation of a conventional band-sequential image (BSI) type multispectral imager that exhibits chromatic focus shift errors.

The systems and methods disclosed herein provide for dynamic correction of chromatic errors within an individual band being acquired, as a BSI multispectral imaging system acquires a spectral cube. In general, a BSI system can be characterized by the range of wavelengths over which it collects a spectrum, which is termed the instrument's spectral range $\lambda_{range}$; and by the range of wavelengths which participate in any individual measurement, which is termed its instantaneous bandwidth $\lambda_{instant}$. The bandwidth can be described in terms of conventional measures, such as the full-width at half-maximum (FWHM) of the spectral distribution, or other measures. In some instruments, the FWHM of the instantaneous bandwidth $\lambda_{instant}$ is identical to the FWHM of the instrument as a whole; this is the case, for example, when the cube is constructed by simply stacking individual images into a cube, without performing any spectral processing such as smoothing, deconvolution, and so on.

Typically, an instrument is designed subject to the constraint that it performs well over a particular spectral range $\lambda_{range}$, which can be relatively broad. For example, a multispectral camera (MSC) or multispectral imaging system (MSIS) can operate over the visible range 420-700 nm, over the range 450-850 nm, over the range 450-950 nm, over the range 500-1000 nm, or over even broader wavelength ranges.

The instantaneous range of wavelengths $\lambda_{instant}$ can vary greatly with the application. In some embodiments, such as in Raman imaging systems, the instantaneous range of wavelengths is of order 1 nm or less, so the light is essentially monochromatic. In situations such as fluorescence imaging or bright-field microscopy, $\lambda_{instant}$ is more typically in the range 10-40 nm. In certain applications, even broader bandwidths are involved. For example, a BSI system can be used for RGB color imaging or infra-red false-color imaging. In these applications, the instantaneous bandwidths range from 80 nm for visible RGB color imaging up to as much as 150 nm for infra-red false-color imaging.

In many systems, it can be desirable to obtain images with resolution of at least 512×512 pixels, and more typically of 1024×1024 pixels or even 2048×2048 pixels. In certain applications, such as histopathology, it can be vital that adjacent images be aligned and tiled in mosaic fashion, which places demands on the degree of distortion or pincushioning.

Designing a system to meet these requirements in concert over a wide range $\lambda_{range}$ or 100 nm or more is demanding. In general, optical designs are developed and evaluated using ray-tracing software such as Zemax from Zemax Development Corporation (Bellevue, Wash.), and are optimized for use over a selected range of wavelengths.

The systems and methods disclosed herein enable an optical designer to optimize over a narrower range of wavelengths $\lambda_{instant}$ rather than $\lambda_{range}$, which considerably eases the design constraints. As a result, the design criteria can be met using fewer lens elements and/or using less costly materials and/or with a higher level of performance. The fitness of a design can be determined using ray-tracing methods just mentioned. Since the BSI system will be operated over the full range $\lambda_{range}$, it should perform well in a variety of configurations, corresponding to each of the various wavelength bands involved; each of these, however, has a restricted range instant over which it should perform well. As a practical matter, ray-tracing programs can be used to optimize a parameter of interest—such as focus or magnification—by adjustment of the position of one or more elements in the optical system, as the system is evaluated at each of its wavelength bands.

FIG. 1 shows a schematic representation of a conventional band-sequential image (BSI) type multispectral imaging system ("MSIS"), including an image-forming system 10 which generates a first image at position 11 for light of first wavelength λ, and at position 11' for light of a second wavelength λ'. The imager also includes a multispectral camera ("MSC") that includes a wavelength filter 12, relay lens 15, and imaging sensor 17. Filter 12 selects a narrow range of wavelengths for transmission and substantially blocks all others. Relay lens 15 forms a second image of the image at position 11 at location 16 for light of wavelength λ, and forms a second image of the image at position 11' at location 16' for light of wavelength λ'. The size of the images at 11' and at 16' depend upon wavelength λ'. Imaging sensor 17 is positioned with its light-sensitive surface substantially coincident with location 16.

Figure 2:
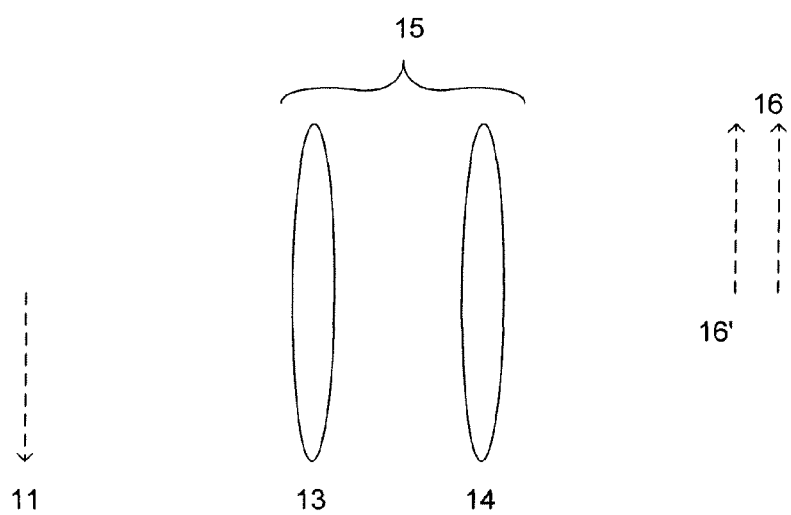
FIG. 2 shows a conventional relay lens 15 used in a multispectral camera which has inherent chromatic error.

In addition to chromatic errors resulting from the image forming optics, additional chromatic errors can result from the relay lens in the MSC. For example, FIG. 2 shows relay lens 15 used in the multispectral camera and which has inherent chromatic error. Lens elements 13 and 14 of the relay lens relay an image at position 11 to position 16 when operated at wavelength λ, but relay an image at position 11 to position 16' when operated at wavelength λ'. In this example, the magnification is unchanged with wavelength.

As described herein, a dynamic correction in the position of one or more of the optics in the relay lens can reduce chromatic errors in the MSC, the beam-forming optics, or the MSIS as a whole.

Figure 3A:
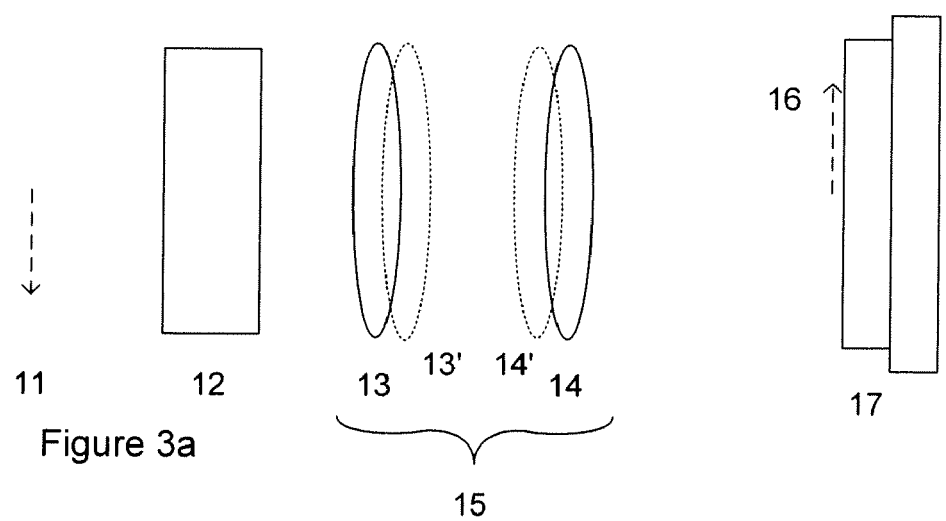
FIG. 3a shows a multispectral camera ("MSC") that includes relay lens 15, filter 12, and an imaging sensor 17, where dynamic correction is performed for inherent chromatic focus shift errors in the camera by adjusting the position of lens elements 13 and 14 to different positions illustrated as 13' and 14', respectively, as the filter 12 is configured to transmit light of various selected wavelength bands of interest in time sequence.

For example, FIG. 3a shows a MSC that includes relay lens 15, filter 12, and an imaging sensor 17, where dynamic correction is performed for inherent chromatic focus shift errors in the camera by adjusting the position of lens elements 13 and 14 to different positions illustrated as 13' and 14', respectively, as the filter 12 is configured to transmit light of various selected wavelength bands of interest in time sequence. The wavelength-dependent position shifts from nominal position are termed $X_1(\lambda)$ and $X_2(\lambda)$, respectively. Images are acquired for each wavelength band. Consequently, the image at position 11 is relayed to imaging sensor 17 at position 16 in sharp focus for all wavelength bands.

Besides chromatic focus shift error, the dynamic correction can also correct for lateral color errors.

Figure 3B:
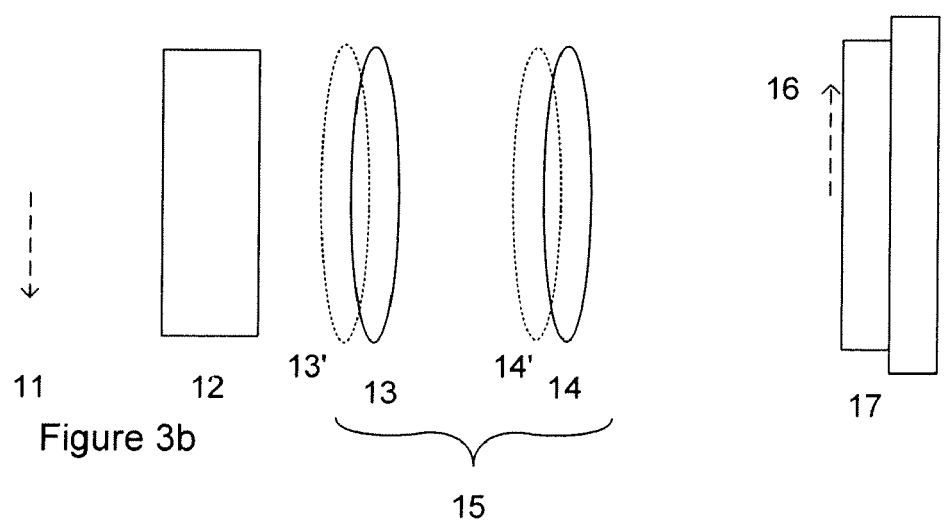
FIG. 3b shows a MSC that includes a relay lens 15, filter 12 and imaging sensor 17, where dynamic correction is performed for inherent lateral color errors in the camera by adjusting the position of lens elements 13 and 14 to different positions illustrated as 13' and 14', respectively, as the filter 12 is configured to transmit light of various selected wavelength bands of interest in time sequence.

For example, FIG. 3b shows a MSC that includes a relay lens 15, filter 12 and imaging sensor 17, where dynamic correction is performed for inherent lateral color errors in the camera by adjusting the position of lens elements 13 and 14 to different positions illustrated as 13' and 14', respectively, as the filter 12 is configured to transmit light of various selected wavelength bands of interest in time sequence. Images are acquired for each wavelength band. Consequently, the image at position 11 is relayed to imaging sensor 17 at position 16 with constant magnification M(λ) for all wavelength bands.

Furthermore, in some embodiments, the dynamic correction can correct for both chromatic focus shift errors and lateral color errors in the MSC.

Figure 3C:
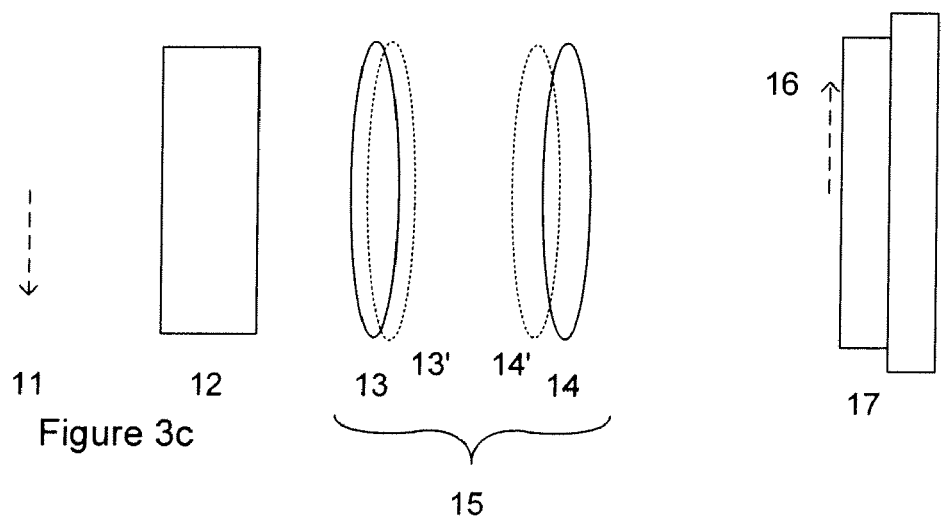
FIG. 3c shows a MSC that includes a relay lens 15, filter 12 and imaging sensor 17, where dynamic correction is performed for both inherent focus shift and lateral color errors of the camera by adjusting the position of lens elements 13 and 14 to different positions illustrated as 13' and 14', respectively, as the filter 12 is configured to transmit light of various selected wavelength bands of interest in time sequence.

FIG. 3c shows a MSC that includes a relay lens 15, filter 12 and imaging sensor 17, where dynamic correction is performed for inherent focus shift and lateral color errors of the camera by adjusting the position of lens elements 13 and 14 to different positions illustrated as 13' and 14', respectively, as the filter 12 is configured to transmit light of various selected wavelength bands of interest in time sequence. Images are acquired for each wavelength band. Consequently, the image at position 11 is relayed to imaging sensor 17 at position 16 in sharp focus and with constant magnification M(λ) for all wavelength bands.

In further embodiments, the dynamic correction in the MSC also corrects for chromatic errors in the image forming system.

Figure 4A:
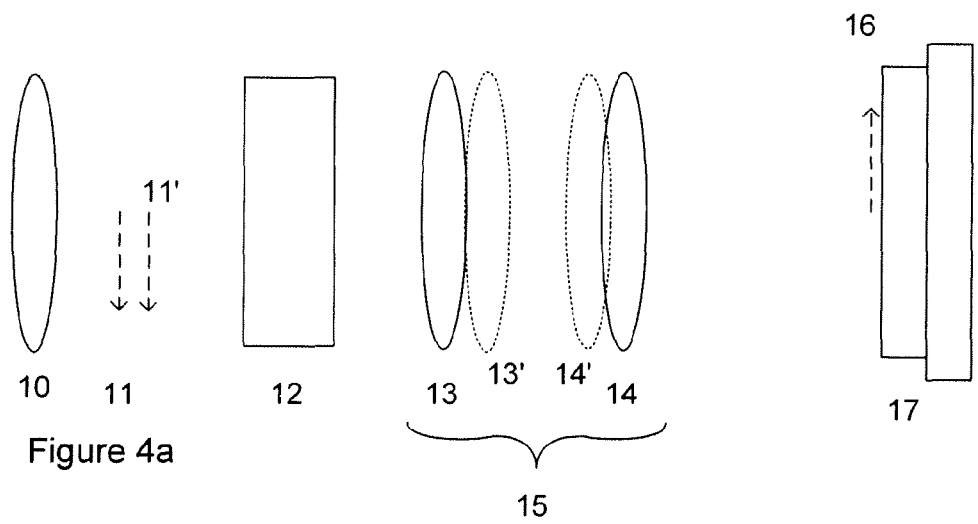
FIG. 4a shows a multispectral imaging system ("MSIS") that includes image-forming system 10 and a MSC including relay lens 15, filter 12 and imaging sensor 17, where dynamic correction is performed for focus shift in the image-forming system 10 and in the relay lens 15 by adjusting the position of lens elements 13 and 14 to different positions illustrated as 13' and 14', respectively, as the filter 12 is configured to transmit light of various selected wavelength bands of interest in time sequence.

FIG. 4a shows a MSIS that includes image-forming system 10, and a MSC including relay lens 15, filter 12 and imaging sensor 17, where dynamic correction is performed for focus shift in the image-forming system 10 and in the relay lens 15 by adjusting the position of lens elements 13 and 14 to different positions illustrated as 13' and 14', respectively, as the filter 12 is configured to transmit light of various selected wavelength bands of interest in time sequence. Images are acquired for each wavelength band. When wavelength λ is selected, the image at position 11 is relayed to imaging sensor 17 at position 16, and when wavelength λ' is selected, the image at position 11' is relayed to the same position. Thus the image is in focus for all wavelength bands.

Figure 4B:
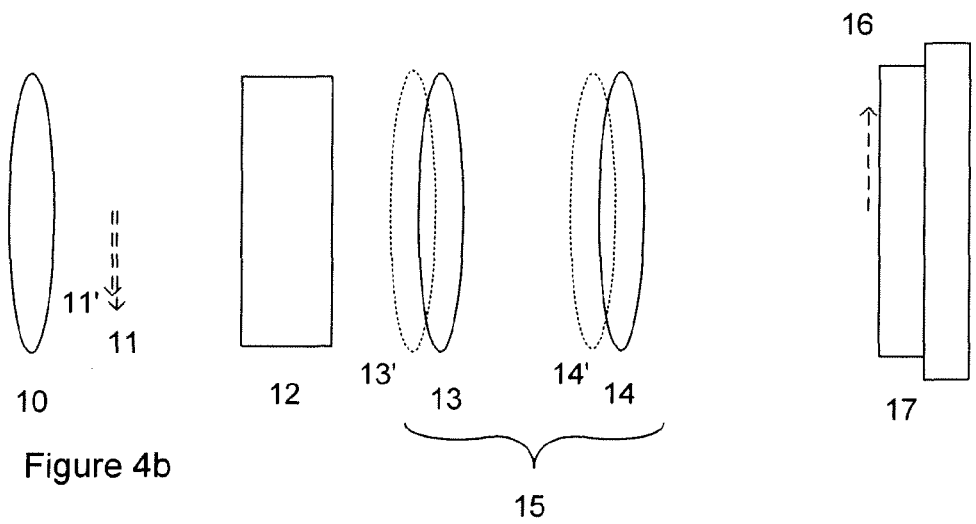
FIG. 4b shows a MSIS that includes image-forming system 10 and a MSC including relay lens 15, filter 12 and imaging sensor 17, where dynamic correction is performed to correct lateral color errors in the image-forming system 10 and in the relay lens 15 by adjusting the position of lens elements 13 and 14 to different positions illustrated as 13' and 14', respectively, as the filter 12 is configured to transmit light of various selected wavelength bands of interest in time sequence.

FIG. 4b shows a MSIS that includes image-forming system 10, and a MSC including relay lens 15, filter 12 and imaging sensor 17, where dynamic correction is performed to correct lateral color errors in the image-forming system 10 and in the relay lens 15 by adjusting the position of lens elements 13 and 14 to different positions illustrated as 13' and 14', respectively, as the filter 12 is configured to transmit light of various selected wavelength bands of interest in time sequence. Images are acquired for each wavelength band. Consequently, the image at position 11 is relayed to imaging sensor 17 at position 16 with magnification M(λ) that is chosen so that the overall magnification of the system 1 is substantially the same for all wavelength bands.

Figure 4C:
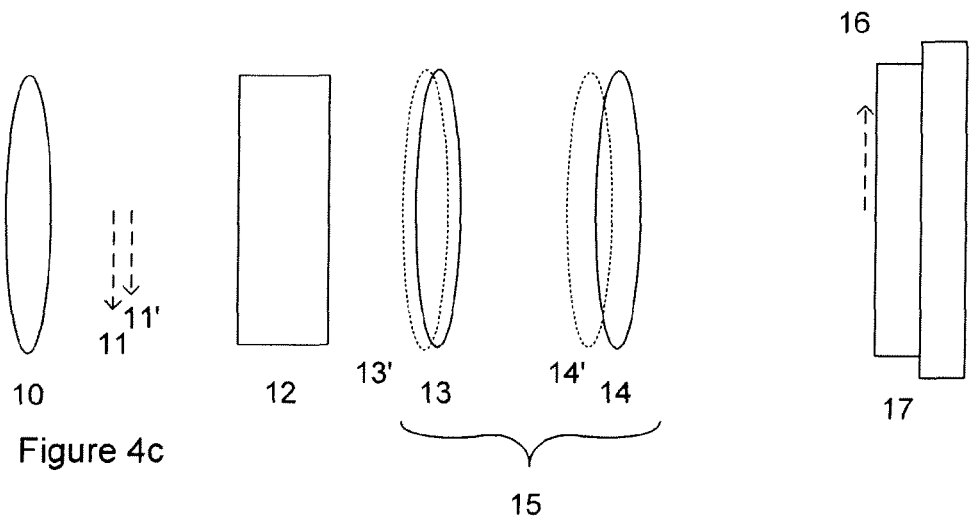
FIG. 4c shows a MSIS that includes image-forming system 10 and a MSC including a relay lens 15, filter 12 and imaging sensor 17, where dynamic correction is performed for both focus shift and lateral color errors in the image-forming system 10 and in the relay lens 15 by adjusting the position of lens elements 13 and 14 to different positions illustrated as 13' and 14', respectively, as the filter 12 is configured to transmit light of various selected wavelength bands of interest in time sequence.

Finally, FIG. 4c shows a MSIS that includes image-forming system 10, and MSC including relay lens 15, filter 12 and imaging sensor 17, where dynamic correction is performed for focus shift and lateral color errors in the image-forming system 10 and in the relay lens 15 by adjusting the position of lens elements 13 and 14 to different positions illustrated as 13' and 14', respectively, as the filter 12 is configured to transmit light of various selected wavelength bands of interest in time sequence. Images are acquired for each wavelength band. Consequently, when filter 20 selects wavelength band λ, the image at position 11 is relayed to imaging sensor 17 at position 16 in sharp focus, with magnification M(λ); and when filter 20 selects wavelength band λ', the image at position 11' is relayed to imaging sensor 17 at position 16 in sharp focus, with magnification M(λ'). The magnifications M(λ) are chosen so the overall magnification of system 1 is substantially the same for all wavelength bands.

Advantages of the dynamic correction is illustrated in FIGS. 6a, 6b, 7a, and 7b.

FIG. 6a shows an image of a sheet-metal metal part obtained at a wavelength of 700 nm using a Canon 70-200 mm F/4 mm zoom lens as the image-forming system. The positions of lens groups 13 and 14 in relay lens 15, denoted as $X_i(\lambda)$ were fixed and the system was focused while filter 12 was tuned to 550 nm. Then, filter 12 was tuned to 700 nm and an image was taken; this is shown as FIG. 6a. At least one chromatic defect is readily apparent, namely it is clearly out of focus.

FIG. 6b shows an image of the same sample under identical conditions, except that filter 12 was tuned to a wavelength of 800 nm. Even greater defocusing is apparent, relative to FIG. 6a.

FIG. 7a shows an image obtained under the same conditions as FIG. 6a, except the positions $X_i(\lambda)$ of lenses 13 and 14 were set to their near-optimum positions for 700 nm. Essentially all the image degradation has been removed by through this compensation.

FIG. 7b shows the corresponding image when filter 12 is tuned to 800 nm and the positions $X_i(\lambda)$ are set to their near-optimum positions for 800 m. Again an excellent image was obtained, representing an even greater degree of improvement over the uncorrected image.

Figure 9:
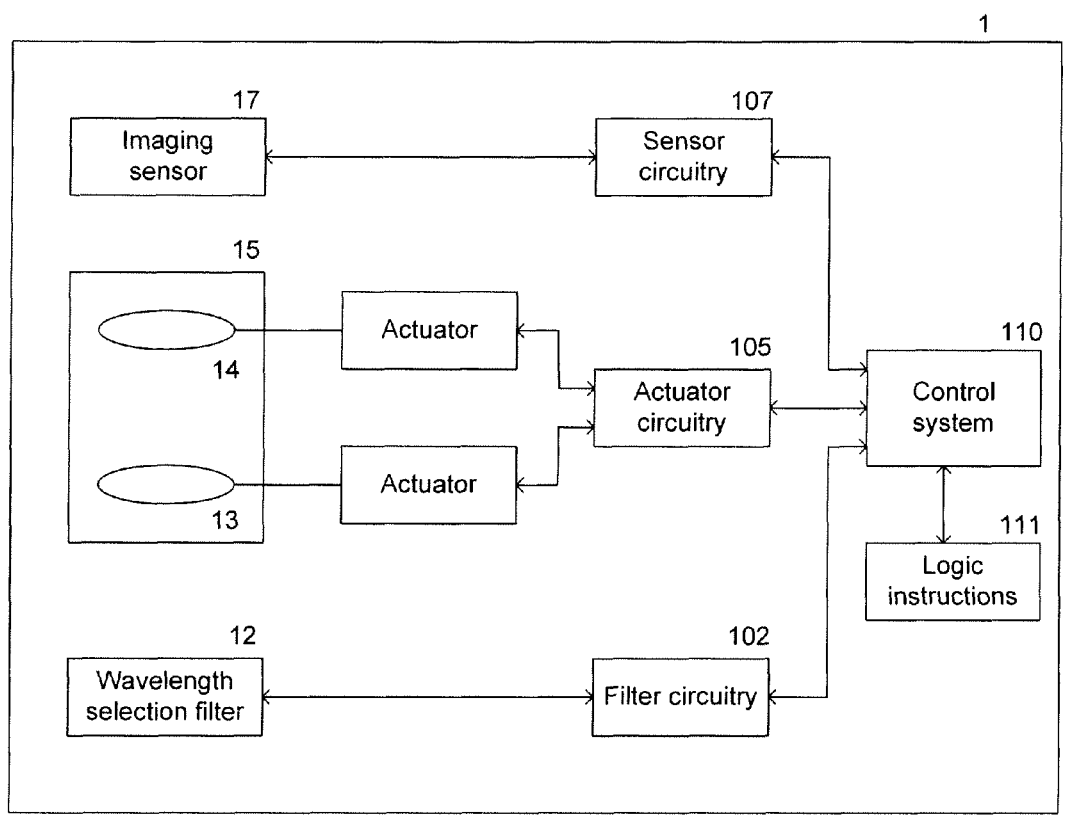
FIG. 9 shows a schematic diagram of a multispectral camera system 1 that includes an imaging sensor 17 with its circuitry 107, wavelength selection filter 12 with associated drive electronics 102, relay lens 15 with lenses 13 and 14 controlled by actuators 103 and 104, under control of actuator electronics 105.

FIG. 9 shows a schematic diagram of the MSC including additional components. Specifically, the MSC includes includes an imaging sensor 17 with its circuitry 107, wavelength selection filter 12 with associated drive electronics 102, relay lens 15 with lenses 13 and 14 controlled by actuators 103 and 104, under control of actuator electronics 105. Control system 110 controls the acquisition, including the selection of wavelength, control of actuators, and readout of images. Software or firmware 111 can include instructions or logic used by control system 110.

Beyond the optical performance, other criteria can be considered in choosing which elements to employ as dynamic correctors. For example, elements which have small size can be chosen so that they can be easily and rapidly moved as desired. Also, the range and physical extent should be compatible with the overall layout of the apparatus, and the need for actuators can limit the placement of optical elements to some degree. Further, it is desirable that the movement of a lens along the optical axis for purposes of compensating chromatic aberrations should not introduce lateral image shift. Accordingly, motion of lenses can be avoided where there is undue sensitivity of image position to slight lateral displacement of the element. However, it is typical that a sensitivity of order unity may be accepted for the primary focus-shift corrector, meaning that its motion is axial to an amount that is of the same order of magnitude as the pixel resolution of the image.

The motion actuation can be performed using any mechanism that suits the design at hand. Potential mechanisms include flexural members, precision linear slides, multiple point kinematic motion. Actuation can be performed using linear or rotary stepper motors, voice coils, or any other devices that provide the necessary mechanical motion and precision. Motion can be open-loop, or alternatively one use closed-loop motion control which takes advantage of information from a sensor such as one or more LVDT elements, or encoders, or proximity sensors, or homing position sensors.

The wavelength selection element can be an electrically-tunable filter such as a liquid crystal tunable filter (LCTF) or acousto-optic tunable filter (AOTF), a mechanical filter wheel which presents a selected filter into the beam under electronic control, or any other element which transmits one selected wavelength band at a time from within a larger range of wavelengths. It is preferable that the wavelength selection not introduce displacement of the image, but if the displacement is systematic it may be removed under software control. If the wavelength selection element introduces systematic focus shift or lateral color, these can be actively compensated away by systems and methods disclosed herein.

Figure 10:
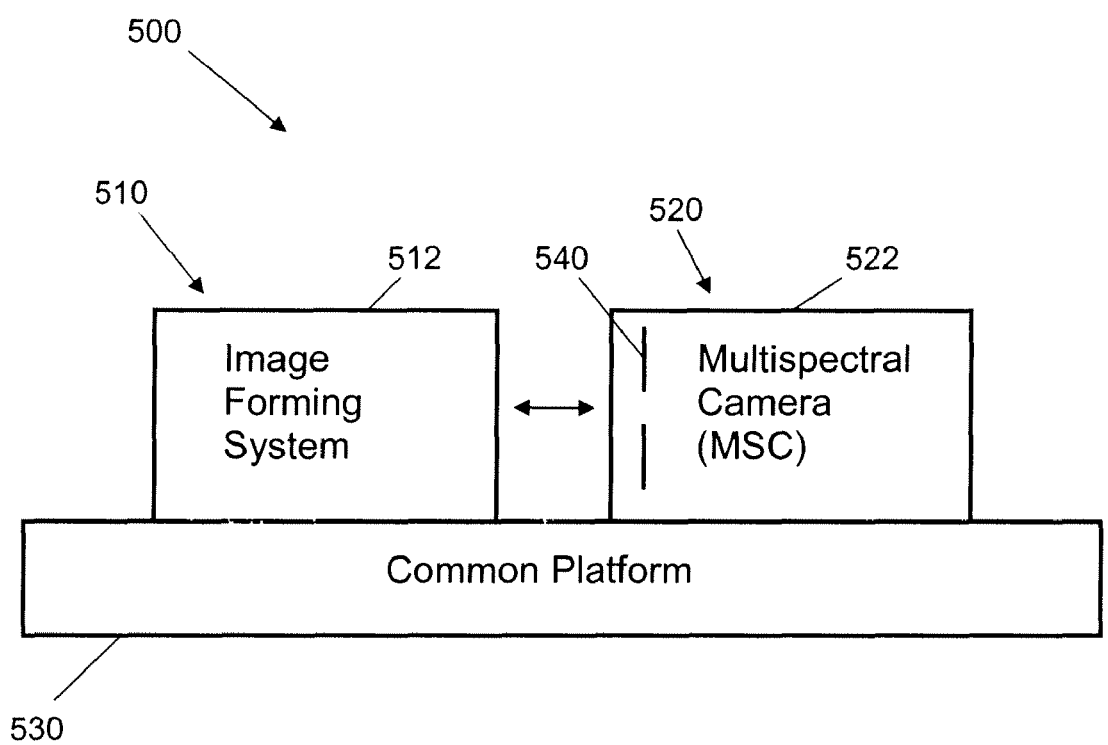
FIG. 10 is a schematic diagram showing a MSIS 500 including a image forming system 510 and a modular MSC 520 including a housing 522 that can be releasably coupled to image forming system 510 on a common platform 530. The housing includes an aperture plate 540 having an aperture 542 through which light from the imaging forming system enters the MSC.

FIG. 10 is a schematic diagram showing a MSIS 500 including a image forming system 510, including a housing 512 and image forming optics 514, and a modular MSC 520 including a housing 522 that can be releasably coupled to the housing 512 for the image forming system 510 on a common platform 530 so that light from the image forming optics can enter the MSC. The MSC housing 522 includes an aperture plate 540 having an aperture 542 through which light from the imaging forming optics enters the MSC. For example, the imaging forming system can be a microscope (such one used for fluorescence imaging), a telescope, or a camera lens (such as one suitable small animal imaging). As a consequence of the dynamic correction, a common MSC can be used with a wide variety of image forming system.

Figure 8:
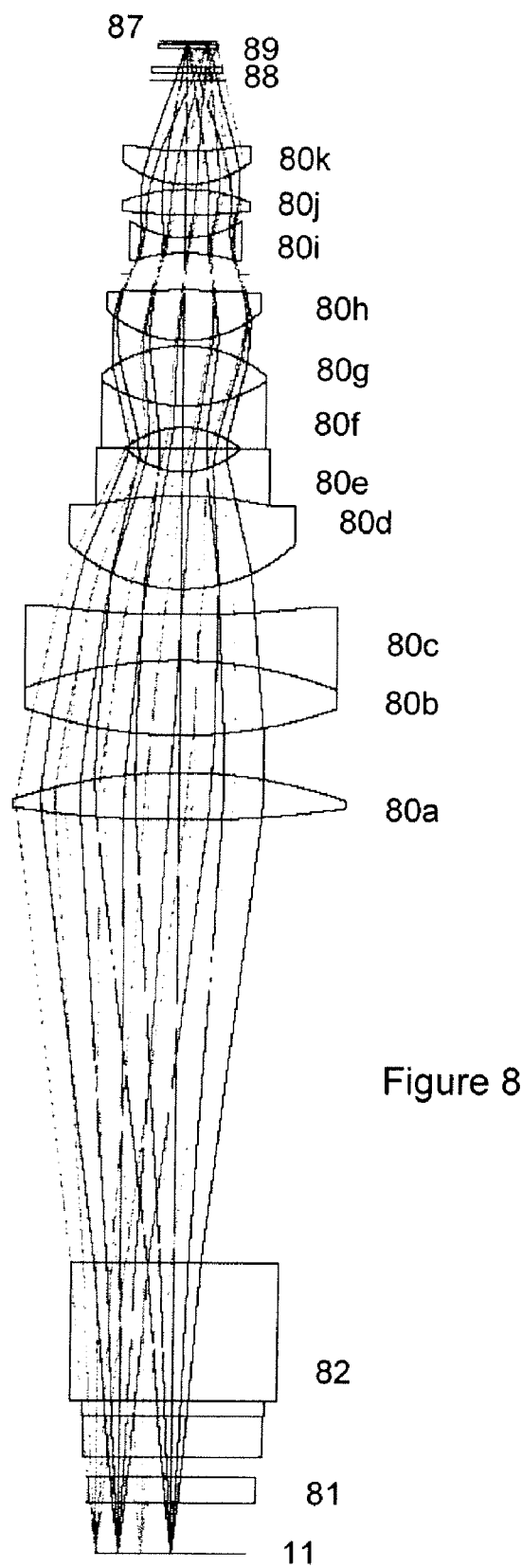
FIG. 8 shows a multispectral imaging camera ("MSC") that receives an image at position 11 from an image-forming system or objective.

FIG. 8 shows a details optical system for a MSC, which receives an image at position 11 from an image-forming system or objective, and includes prefilter 81, liquid crystal tunable filter 82, lenses 80a-80k, and imaging sensor 87 having cooling window 88 and sensor window 89. The position of lens 80a is adjustable about nominal position 83, and lenses 80j-k form a lens group whose position 85 is adjustable. The positions of lenses 80b-i are fixed. The lens prescription and positional arrangement is shown in Table 1 below. Specific optical parameters for the optical elements are described in Table 1 below. The dynamic correction adjusts the position of lens 80a and the position of the group of lenses 80j and 80k to optimize focus and maintain constant magnification as the wavelength band is changed. A ray tracing program optimization provides an exemplary set of positions $X_i(\lambda)$ to which the corresponding lens elements are set to provide dynamic correction of chromatic aberrations. This system performs well over the range 500-950 nm, and provides more than 10 distinct wavelength bands, or more than 16 overlapping bands.

TABLE 1

| Item | Position | R1 | R2 | Material | Thick | Description |
|---|---|---|---|---|---|---|
| 11 | 0 | — | — | — | — | Image |
| 81 | 10 | — | — | BK7 | 3 | Pre-filter |
| 82 | 19 | — | — | various | 37.8 | Tunable filter |
| 80a | 147.4 | 220.6 | −100 | S-BSM16 | 9.3 | Lens 1 |
| 80b | 160.4 | 90.4 | −85.9 | S-BSM16 | 14.65 | Lens 2 |
| 80c | 175.0 | −85.9 | 216.0 | S-NBH5 | 9 | Lens 3 |
| 80d | 192.5 | 32.0 | −79.4 | S-BSM16 | 18.24 | Lens 4 |
| 80e | 215.0 | −79.4 | 16.0 | S-NBH5 | 4.58 | Lens 5 |
| 80f | 210.7 | −17.3 | 29.0 | S-NBH5 | 4.25 | Lens 6 |
| 80g | 228.0 | 29.0 | −25.2 | S-BSM16 | 11.78 | Lens 7 |

TABLE 1-continued

| Item | Position | R1 | R2 | Material | Thick | Description |
|---|---|---|---|---|---|---|
| 80h | 239.8 | 22.4 | −216.0 | S-BSM16 | 9.92 | Lens 8 |
| 80i | 252.8 | −34.5 | 19.9 | S-NBM51 | 3 | Lens 9 |
| 80j | 265.2 | 107.4 | −33.0 | S-BSM16 | 5 | Lens 10 |
| 80k | 271.8 | 19.9 | 56.8 | S-BSM16 | 6.56 | Lens 11 |
| 88 | 293.3 | — | — | BK7 | 1.1 | Sensor cooler window |
| 89 | 297.9 | — | — | N-BK10 | 0.7 | Sensor window |
| 87 | 299.3 | — | — | — | — | Imaging sensor |

More generally, one strategy for developing a design is to optimize the overall optical system for performance at a first wavelength, such as a mid-band wavelength, in the conventional manner, and then to explore which elements provide the necessary adjustment freedom. This strategy will be understood by those skilled in the art of lens design, but one may employ variations on this strategy, or other strategies, so long as the result is a design which meets the needs at hand.

Figure 5:
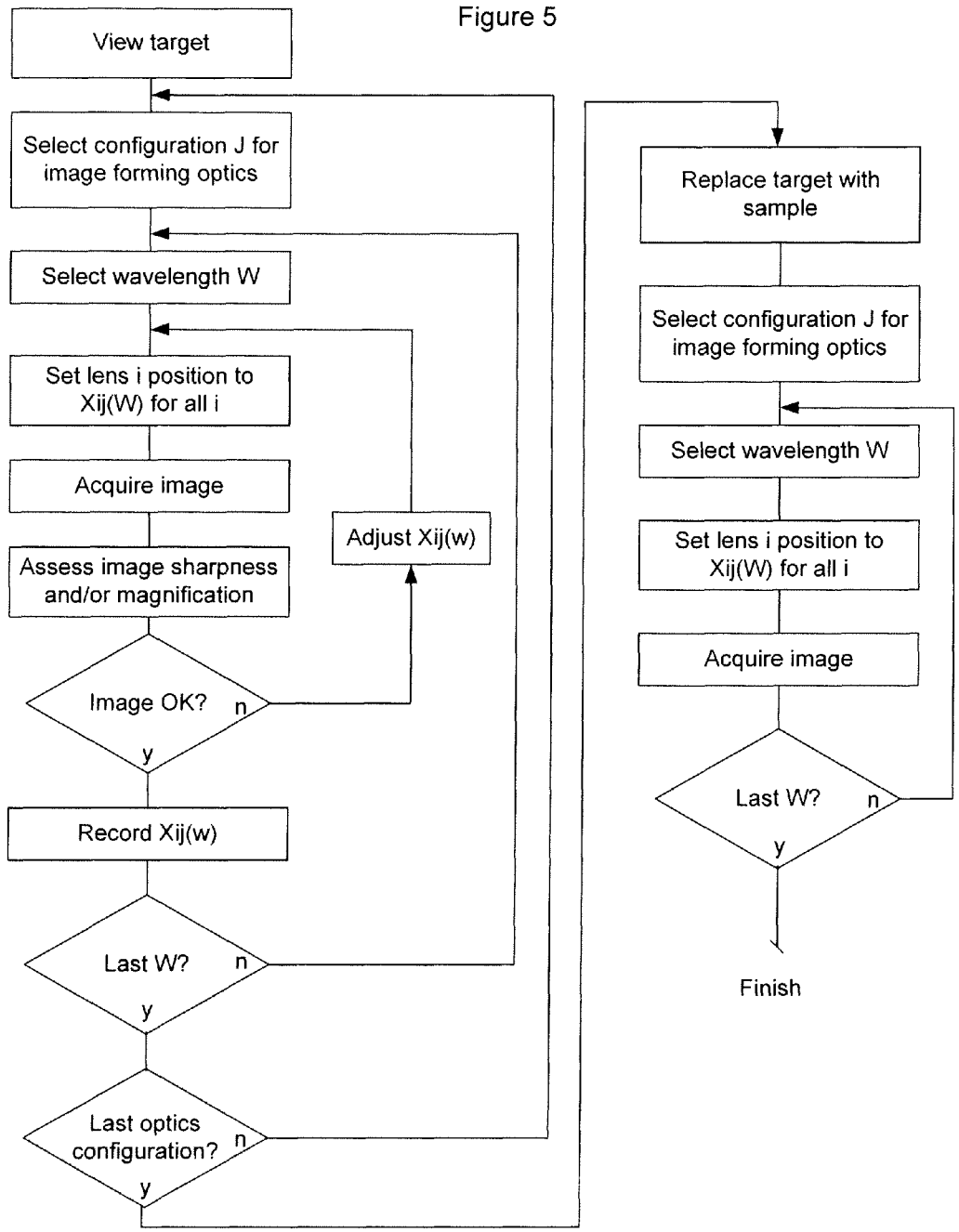
FIG. 5 shows a flow chart for how the settings for the wavelength corrected shift for the dynamically adjusted optical elements $X_i(\lambda)$ may be obtained in situ and then used to dynamically correct for image defects.

The systems and methods disclosed herein include the ability to correct for deficiencies in the multispectral camera (MSC). When this is done, the positions $X_i(\lambda)$ may not be optimum, as the image-forming system coupled to the MSC brings its own contributions to focus shift and lateral color. Accordingly, these can be developed these in situ with the complete instrument participating in the measurement. The sequence is shown in FIG. 5, which shows a flow chart for how the settings $X_i(\lambda)$ may be obtained in situ and then used to dynamically correct for image defects. At the core of the process is the use of a target that includes sufficient structure that focus and magnification can be assessed at a variety of wavelengths. Note that ideally, the target is free of complex spatial-spectral structure. For example, it would be possible, but relatively difficult, to determine the best $X_i(\lambda)$ for an MSC which spanned the 400-700 nm visible range, using a target of colored polka-dots, if each one spanned only a single color; $X_i(\lambda)$ would have to be established for several sub-ranges, together with correspondences between the sub-ranges. A target of black spots is typically easier to use.

This is illustrated for the case of use with a microscope as the image forming system, which is an important application. A chrome-grid slide can be used as a target. The MSC is configured with its actuators set to the values of $X_i(\lambda)$ which correct its intrinsic errors, but not those of the microscope, and an image is taken with the wavelength selection element 12 set to transmit a first wavelength. The microscope focus is adjusted until the sharpest image is attained, using its stage or other means. The wavelength selection is changed to transmit a second wavelength, while the microscope focus is unchanged. The MSC is configured to a range of $X_i(\lambda)$ settings while optimum focus and magnification are sought; the resulting settings are recorded as the target $X_i(\lambda)$ for the combined instrument. Cycling through all wavelengths and repeating this process continues until a complete set of configurations $X_i(\lambda)$ is attained.

Inasmuch as the MSC is correcting for the complete microscope system, the optimum or near-optimum settings depend on the objective, the tube lens or projection lens, and other optics which may be present in the microscope. When the microscope configuration is changed, for example to select a different objective, different settings $X_i(\lambda)$ are used to apply proper correction. Since the deficiencies of a given microscope are relatively stable for a given configuration of components, it is useful to perform the in situ characterization once and store the set of all $X_i(\lambda)$ corresponding to the microscope configurations of interest; these can then be rapidly summoned forth under software control.

In some embodiments, an MSC can be constructed which corrects for components such as microscope objectives, and whose performance is viewed as a fixed constraint by an end-user or system designer. Even apochromatic objectives are not free of focus shift or lateral color, and can introduce artifacts into multispectral image cubes. Achromatic objectives present the same problem, often to a greater degree.

Also, in many cases the objective meets other requirements which are fundamentally incompatible with good achromatization, or which are costly to achieve in concert with this goal. For example, in fluorescence microscopy, there are a limited set of materials due to requirements such as the need to tolerate and transmit ultraviolet light, to be relatively free of fluorescence, and so on. This is necessary because fluorescence microscopes both transmit ultraviolet radiation (e.g., less than or equal to about 440 nm) to the sample and collect fluorescence from the sample at larger wavelengths (e.g., greater than or equal to about 450 nm.) Consequently, these objectives often have relatively high degree of focus shift with wavelength, and of lateral color, compared to other objectives such as apochromatic objectives. The systems and methods disclosed herein are especially valuable in settings where one wishes to obtain fluorescence imagery over a wide range of wavelengths $\lambda_{range}$, such as over a range of 100 nm or more.

There are fluorescent dyes which emit in the red or infrared portion of the spectrum. Examples of these include the Cy3.5, Cy5, and Cy5.5 from Amersham Biosciences (Piscataway, N.J.), IR800 from Li-Cor Biosciences (Lincoln, Nebr.), and others. Similarly, there are an increasing number of probes based on quantum dots which emit in the red and near-infrared portion of the spectrum. The above agents are often used in concert with one another, and with probes which emit in the blue and green portions of the visible, such as DAPI, fluorescein, Hoechst, and others. In many applications, multiple probes are present in the same sample for purposes of multiplexed labeling, and it is desired that the relative positions of each probe be accurately identified. This places new demands on the imaging system, since a given sample can include emissions spanning 100 nm or more, or 200 nm or more, or which extend into the infrared where existing microscope performance is generally degraded compared to the visible. The systems and methods disclosed herein can correct for focus shift and lateral color without modification to the microscope or objective.

A further important aspect of the disclosed systems and methods is that, since all aspects of the MSC system are retained, it is possible to optimize the coordination of dynamic correction of focus with image acquisition, in a single piece of software.

Compared against alternatives such as adjusting the stage or objective, the systems and methods disclosed herein eliminate the possibility of unwanted lateral motion, and provide for correcting the lateral color. Absent this correction, the image can be re-focused, but the relative size of an object in one plane of the spectral cube may not precisely match the size of that same object in another plane. Errors of two or more pixels are commonly seen in the corner of a megapixel image, even for a research-grade microscope.

The disclosed systems and methods can be used for imaging macroscopic objects (e.g., small animals in medical studies) across the visible and near-infrared range. Camera lenses are typically designed for use in the visible range, and can exhibit large amounts of focus shift and/or lateral color when operated in the infrared, especially at $\lambda=700$ nm or longer.

The systems and methods correct these defects so their effect is reduced or eliminated, resulting in a great performance improvement. Also, the systems and methods provide a way to use commercial camera lenses, which have low cost and high optical performance in the visible region. This is a often preferred alternative to making a custom lens that exhibits less infrared chromatic distortion, since doing so involves significant cost, time, and expertise.

The magnitude of lateral color that can be corrected using the systems and methods disclosed herein is in excess of 0.5% for the example shown in Table 1, and up to 1% correction or more can be provided for particular designs. This is readily understood by considering that a lateral color correction range requirement of 1% or even 2% is equivalent to a requirement for a zoom lens with a very small adjustment range, and techniques for realizing such a lens are well within the optical design art.

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. A multispectral detection system for use with image-forming optics configured to form an image of a sample, the detection system comprising:
   an imaging detector;
   relay optics comprising multiple optical elements, the relay optics positioned to relay the image formed by the image-forming optics to the imaging detector;
   an actuator coupled to one of the optical elements in the relay optics and configured to adjust a position of the coupled optical element, wherein the coupled optical element has optical power; and
   control electronics configured to cause the actuator to adjust the position of the coupled optical element in the relay optics in response to a wavelength band selection by a wavelength selection element positioned to select one wavelength band for the image from among two or more different wavelength bands within an overall wavelength range,
   wherein the adjustment to the position of the coupled optical element varies depending on which of the different wavelength bands is selected by the wavelength selection element.

2. The system of claim 1, further comprising the image-forming optics.

3. The system of claim 1, wherein the imaging detector, relay optics, actuator, and control optics are part of a multi-spectral camera, and wherein the multispectral camera further comprises a modular housing that can be releasably coupled to a housing for the image-forming optics.

4. The system of claim 1, further comprising the wavelength selection element.

5. The system of claim 1, wherein a position of the image formed by the image-forming optics varies with the selected wavelength band, and wherein the control electronics are configured to adjust the position of the coupled optical element to maintain a focus of the image formed by the relay optics on the imaging detector in response to the wavelength band selection.

6. The system of claim 1, wherein a magnification of the image formed by the image-forming optics varies with the selected wavelength band, and wherein the control electronics are configured to adjust the position of the coupled optical element to maintain a magnification of the image formed by the relay optics on the imaging detector in response to the wavelength band selection.

7. The system of claim 1, further comprising a second actuator coupled to a second one of the optical elements in the relay optics and configured to adjust a position of the coupled second one of the optical elements.

8. The system of claim 1, wherein the control electronics are further configured to control the selection of the wavelength band by the wavelength selection element in response to a user input or preprogrammed protocol.

9. The system of claim 1, wherein a magnification of the image formed by the image-forming optics varies with the selected wavelength band, and wherein the control electronics are configured to adjust the position of the coupled optical element so that a magnification of the image formed by the relay optics on the imaging detector does not change in response to the wavelength band selection.

10. The system of claim 1, wherein the overall wavelength range comprises a spectral range of 200 nm or more.

11. The system of claim 1, wherein the wavelength selection element is configured to select the one wavelength band from among 4 or more wavelength bands.

12. The system of claim 1, wherein the image-forming optics comprise a microscope system.

13. The system of claim 1, wherein the image-forming optics are configured to form the image of the sample along an optical path, and wherein wavelength selection element is positioned in the optical path.

14. The system of claim 1, wherein wavelength selection element is an optical filter.

15. The system of claim 1, wherein the coupled optical element having optical power comprises a lens.

16. The system of claim 7, wherein a position of the image formed by the image-forming optics, a magnification of the image formed by the image-forming optics, or both, varies with the selected wavelength band, and wherein the control electronics are configured to adjust the positions of each of the coupled optical elements to maintain a focus of the image formed by the relay optics on the imaging detector, a magnification of the image formed by the relay optics on the imaging detector, or both, in response to the wavelength band selection.

17. The system of claim 10, wherein the selected wavelength band comprises a distribution of wavelengths having a full-width at half-maximum (FWHM) width of 50 nm or less.

18. The system of claim 12, wherein the microscope system is a fluorescence microscope configured to transmit excitation light to a sample, and receive fluorescence from the sample in response to the excitation light.

19. A method, comprising:
   selecting a wavelength band for an image from among two or more different wavelength bands within an overall wavelength range;
   adjusting a position of an optical element having optical power in a system of relay optics in response to the selection of the wavelength band, wherein the adjustment to the position of the optical element varies depending on which of the different wavelength bands is selected; and
   receiving an image from image-forming optics, and relaying the image to an imaging detector using the relay optics.

20. The method of claim 19, further comprising selecting the wavelength band using a wavelength selection element.

21. The method of claim 19, wherein selecting the wavelength band for the image is performed in response to a user input or preprogrammed protocol.

22. The method of claim 19, wherein a position of the image from the image-forming optics varies with the selected wavelength band, and wherein the position of the optical element is adjusted to maintain a focus of the image formed by the relay optics on the imaging detector in response to the wavelength band selection.

23. The method of claim 19, wherein a magnification of the image from the image-forming optics varies with the selected wavelength band, and wherein the position of the optical element is adjusted to maintain a magnification of the image formed by the relay optics on the imaging detector in response to the wavelength band selection.

24. The method of claim 19, further comprising adjusting a position of a second optical element in the system of relay optics in response to the selection of the wavelength band.

25. The method of claim 19, wherein a magnification of the image from the image-forming optics varies with the selected wavelength band, and wherein the position of the optical element is adjusted so that a magnification of the image formed by the relay optics on the imaging detector does not change in response to the wavelength band selection.

26. The method of claim 19, wherein the overall wavelength range comprises a spectral range of 200 nm or more.

27. The method of claim 19, wherein the wavelength band is selected from among 4 or more wavelength bands.

28. The method of claim 19, wherein the image is received from image-forming optics that comprise a microscope system.

29. The method of claim 19, further comprising coupling a multispectral camera comprising the imaging detector, relay optics, and an actuator for adjusting the optical element in the relay optics to a housing for the image-forming optics.

30. The method of claim 19, wherein the optical element having optical power comprises a lens.

31. The method of claim 20, wherein the image-forming optics are configured to form the image along an optical path, and wherein the wavelength selection element is positioned in the optical path.

32. The method of claim 20, wherein the wavelength selection element is an optical filter.

33. The method of claim 24, wherein a position of the image from the image-forming optics, a magnification of the image from the image-forming optics, or both, varies with the selected wavelength band, and wherein the positions of each of the adjustable optical elements are adjusted to maintain a focus of the image formed by the relay optics on the imaging detector, a magnification of the image formed by the relay optics on the imaging detector, or both, in response to the wavelength band selection.

34. The method of claim 26, wherein the selected wavelength band comprises a distribution of wavelengths having a full-width at half-maximum (FWHM) width of 50 nm or less.

35. The method of claim 28, wherein the microscope system is a fluorescence microscope configured to transmit excitation light to a sample, and receive fluorescence from the sample in response to the excitation light.

36. The method of claim 29, wherein the multispectral camera and the housing or the image-forming optics are releasably coupled.

37. A multispectral detection system for use with image-forming optics configured to form an image of a sample along an optical path, the detection system comprising:
an imaging detector;
relay optics comprising multiple optical elements, the relay optics positioned to relay the image formed by the image-forming optics to the imaging detector;
an actuator coupled to one of the optical elements in the relay optics and configured to adjust a position of the coupled optical element; and
control electronics configured to cause the actuator to adjust the position of the coupled optical element in the relay optics in response to a wavelength band selection by a wavelength selection element positioned in the optical path to select one wavelength band for the image from among two or more different wavelength bands within an overall wavelength range,
wherein the adjustment to the position of the coupled optical element varies depending on which of the different wavelength bands is selected by the wavelength selection element.

38. The system of claim 37, wherein the wavelength selection element is an optical filter.

39. The system of claim 37, wherein the coupled optical element has optical power.

40. The system of claim 37, wherein the coupled optical element comprises a lens.

41. The system of claim 37, wherein a position of the image formed by the image-forming optics varies with the selected wavelength band, and wherein the control electronics are configured to adjust the position of the coupled optical element to maintain a focus of the image formed by the relay optics on the imaging detector in response to the wavelength band selection.

42. The system of claim 37, wherein a magnification of the image formed by the image-forming optics varies with the selected wavelength band, and wherein the control electronics are configured to adjust the position of the coupled optical element to maintain a magnification of the image formed by the relay optics on the imaging detector in response to the wavelength band selection.

43. The system of claim 37, further comprising a second actuator coupled to a second one of the optical elements in the relay optics and configured to adjust a position of the coupled second one of the optical elements.

44. The system of claim 37, wherein a position of the image formed by the image-forming optics, a magnification of the image formed by the image-forming optics, or both, varies with the selected wavelength band, and wherein the control electronics are configured to adjust the positions of each of the coupled optical elements to maintain a focus of the image formed by the relay optics on the imaging detector, a magnification of the image formed by the relay optics on the imaging detector, or both, in response to the wavelength band selection.

45. A method, comprising:
selecting a wavelength band for an image from among two or more different wavelength bands within an overall wavelength range;
adjusting a position of an optical element in a system of relay optics in response to the selection of the wavelength band by a wavelength selection element positioned in an optical path, wherein the adjustment to the position of the optical element varies depending on which of the different wavelength bands is selected; and receiving an image along the optical path from image-forming optics, and relaying the image to an imaging detector using the relay optics.

46. The method of claim 45, wherein the wavelength selection element is an optical filter.

47. The method of claim 45, wherein the optical element has optical power.

48. The method of claim 45, wherein the optical element comprises a lens.

49. The method of claim 45, wherein a position of the image from the image-forming optics varies with the selected wavelength band, and wherein the position of the optical element is adjusted to maintain a focus of the image formed by the relay optics on the imaging detector in response to the wavelength band selection.

50. The method of claim 45, wherein a magnification of the image from the image-forming optics varies with the selected wavelength band, and wherein the position of the optical element is adjusted to maintain a magnification of the image formed by the relay optics on the imaging detector in response to the wavelength band selection.

51. The method of claim 45, further comprising adjusting a position of a second optical element in the system of relay optics in response to the selection of the wavelength band.

52. The method of claim 51, wherein a position of the image from the image-forming optics, a magnification of the image from the image-forming optics, or both, varies with the selected wavelength band, and wherein the positions of each of the adjustable optical elements are adjusted to maintain a focus of the image formed by the relay optics on the imaging detector, a magnification of the image formed by the relay optics on the imaging detector, or both, in response to the wavelength band selection.

* * * * *

UNITED STATES PATENT AND TRADEMARK OFFICE
CERTIFICATE OF CORRECTION

PATENT NO. : 8,330,087 B2  Page 1 of 1
APPLICATION NO. : 12/251632
DATED : December 11, 2012
INVENTOR(S) : Peter L. Domenicali It is certified that error appears in the above-identified patent and that said Letters Patent is hereby corrected as shown below:

Column 17
Line 66, claim 36, delete the word "or" and insert the word --for--

Signed and Sealed this
Nineteenth Day of March, 2013

Teresa Stanek Rea
*Acting Director of the United States Patent and Trademark Office*